Oct. 3, 1944.   G. WALTHER ET AL   2,359,499
TRACTOR-TRAILER COUPLING MEANS
Original Filed Aug. 5, 1940   2 Sheets-Sheet 1

INVENTORS
GEORGE WALTHER
ELMER L. MILLER
BY
ATTORNEYS.

Oct. 3, 1944.　　　G. WALTHER ET AL　　　2,359,499
TRACTOR-TRAILER COUPLING MEANS
Original Filed Aug. 5, 1940　　2 Sheets-Sheet 2

INVENTORS
GEORGE WALTHER
ELMER L. MILLER
BY
ATTORNEYS

Patented Oct. 3, 1944

2,359,499

UNITED STATES PATENT OFFICE 2,359,499

TRACTOR-TRAILER COUPLING MEANS

George Walther and Elmer L. Miller, Dayton, Ohio, assignors to The Dayton Steel Foundry Company, Dayton, Ohio, a corporation of Ohio Original application August 5, 1940, Serial No. 351,540. Divided and this application April 9, 1941, Serial No. 387,766

10 Claims. (Cl. 280—33.1)

This application is a division of our co-pending application Serial No. 351,540, filed August 5, 1940.

This invention relates to the art of tractor and semitrailer combination vehicles, wherein the same are connected through articulated means such as the commonly employed fifth wheel structure. This fifth wheel structure usually includes a lower fifth wheel member on the tractor and an upper fifth wheel member on the forward end of the trailer, which rests upon the lower fifth wheel on the tractor, the vehicles, when in coupled relation for road travel, being connected through a swivel connection provided by a king pin carried by one of the fifth wheel members and locked to the other by means of suitable locking means carried by the latter.

One of the fifth wheel members is preferably mounted to rock about a horizontal axis disposed transversely of the vehicle upon which it is mounted. It is usual today to provide the lower fifth wheel with such rocking mounting and the mounting of the lower fifth wheel is such that when the vehicles are disconnected, the lower fifth wheel normally inclines rearwardly to provide an inclined plane for elevating the forward end of the trailer when the tractor backs into it in coupling.

In the coupling of tractor and semitrailers provided with the fifth wheel coupling means herein referred to, the same are subject to considerable shock incident to the contact of the fifth wheel plates and the contact of the king pin with the locking jaws when the tractor backs into the trailer for coupling. Likewise, during travel, the coupled relation of the fifth wheels is productive of considerable noise and clatter, as well as wear of certain parts, notably the inter-engaging portions of the king pin and locking jaws.

It is a principal object of the present invention to eliminate the aforementioned shock and noise as much as possible by providing a resilient or cushioned mounting for one or both of said fifth wheels respecting the vehicle to which it is attached.

Preferably, the resilient mounting of either of the fifth wheels relative to its vehicle should provide not only for cushioning of the shock incident to the coupling contact of the fifth wheels, but should provide for the cushioning of vertical and longitudinal thrust action of the vehicles relative to one another during travel in coupled relation.

With the foregoing ends in view, the present invention makes novel provision for the resilient mounting of the rockable fifth wheel relative to its vehicle, such that the same is cushioned in respect to permissive longitudinal and vertical movement of said fifth wheel relative to its vehicle. This novel mounting avails of spiral spring means cushioning the transverse rockable axis of the fifth wheel respecting the vehicle to which it is connected.

Other objects and advantages and features of novelty will appear more fully as the description of this invention progresses, in conjunction with the accompanying drawings, in which.

Figure 1:
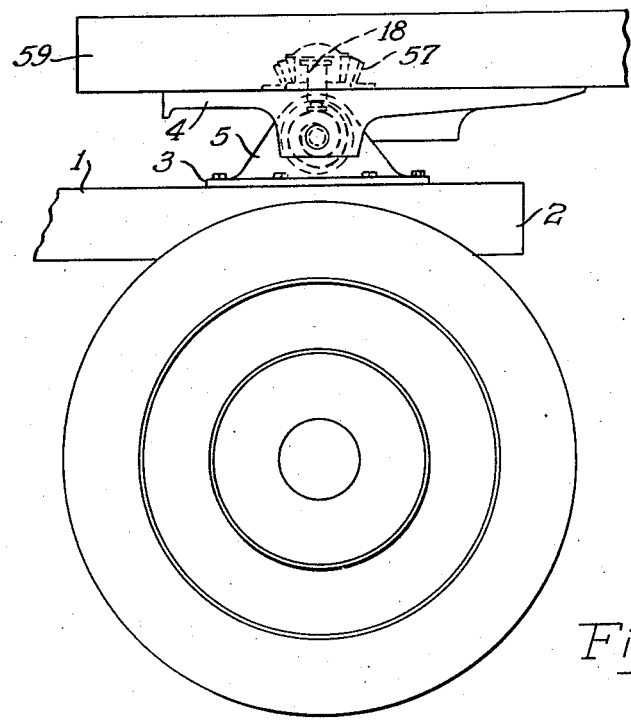
Figure 1 is a side elevational view showing the rear end of a tractor and the forward end of a trailer in coupled relation and embodying the invention.

The numeral 1 designates the frame of a tractor vehicle, and 2 the rear driving wheels thereof. Mounted upon the frame 1 of the tractor are brackets 3 for supporting the lower fifth wheel 4 upon the tractor. The brackets 3 comprise a housing 5 of circular shape having a closed outer side 6, and open at its inner side, as indicated at 7, for the reception of a spiral spring 8.

Figure 3:
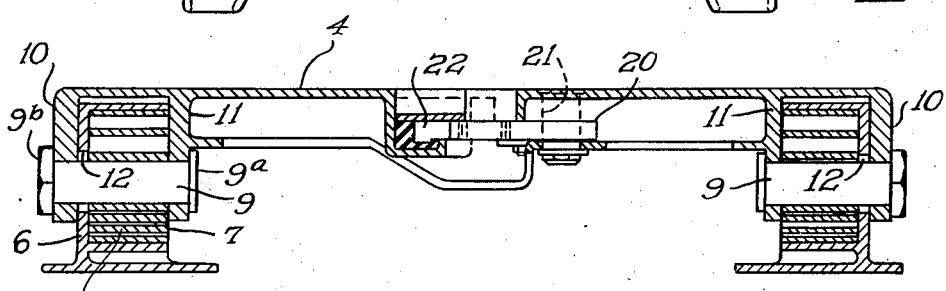
Figure 3 is a transverse, vertical sectional view of the said fifth wheel, taken on the line 3—3 of Figure 2.

The fifth wheel 4 is provided with depending ears 10 and 11, having suitable apertures therein, adapted for the receipt of journal bolts 9 for journaling the fifth wheel 4 rockably relative to the brackets 3. The sides 6 of the housings 5 are provided with apertures 12 of somewhat greater diameter than the journal bolts 9, to permit a certain amount of relative movement of the fifth wheel relative to the brackets 3 when the journal bolts 9 are assembled, as shown in Figures 3 to 5, passing through the respective apertures in the ears 10 and 11, and the aperture 12 in said housing, and with the springs 8 mounted in said housings surrounding said journal bolts.

The journal bolts 9 are provided with heads 9a which may engage one side of the ear 11 and nuts 9b which may be threaded on said bolts for engagement with the ear 10 when the fifth wheel is assembled on the brackets 3 as just described.

When the lower fifth wheel 4 is assembled for rocking movement relative to the brackets 3, as shown in Figures 2 to 5, the weight of the fifth wheel is directly supported through the journal pins 9 by the spiral springs 8 resting in the housings 5 so that the fifth wheel is cushioned relative to the supporting brackets 3 for floating movement thereon, the extent of which is limited by the difference in the diameters of the journal pins 9 and the apertures 12 in the housings 5 through which said journal pins pass.

Figure 4:
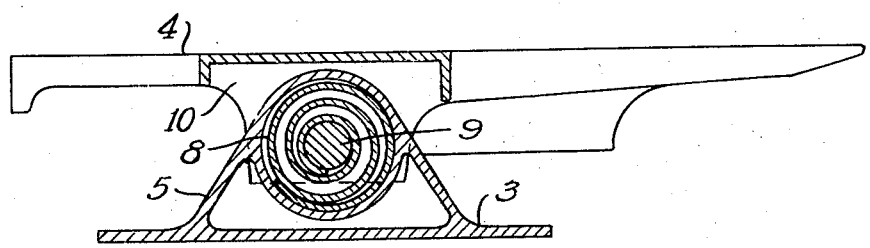
Figure 4 is a longitudinal, vertical sectional view taken on the line 4—4 of Figure 2.
Figure 5:
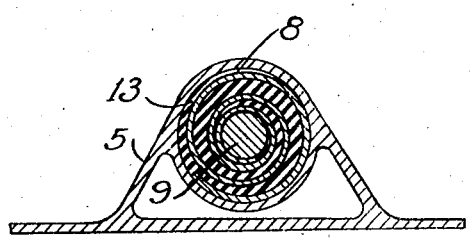
Figure 5 is a view of the lower fifth wheel mounting bracket similar to that shown in Figure 4, but availing of a modified resilient connection of the lower fifth wheel thereto.
Figure 2:
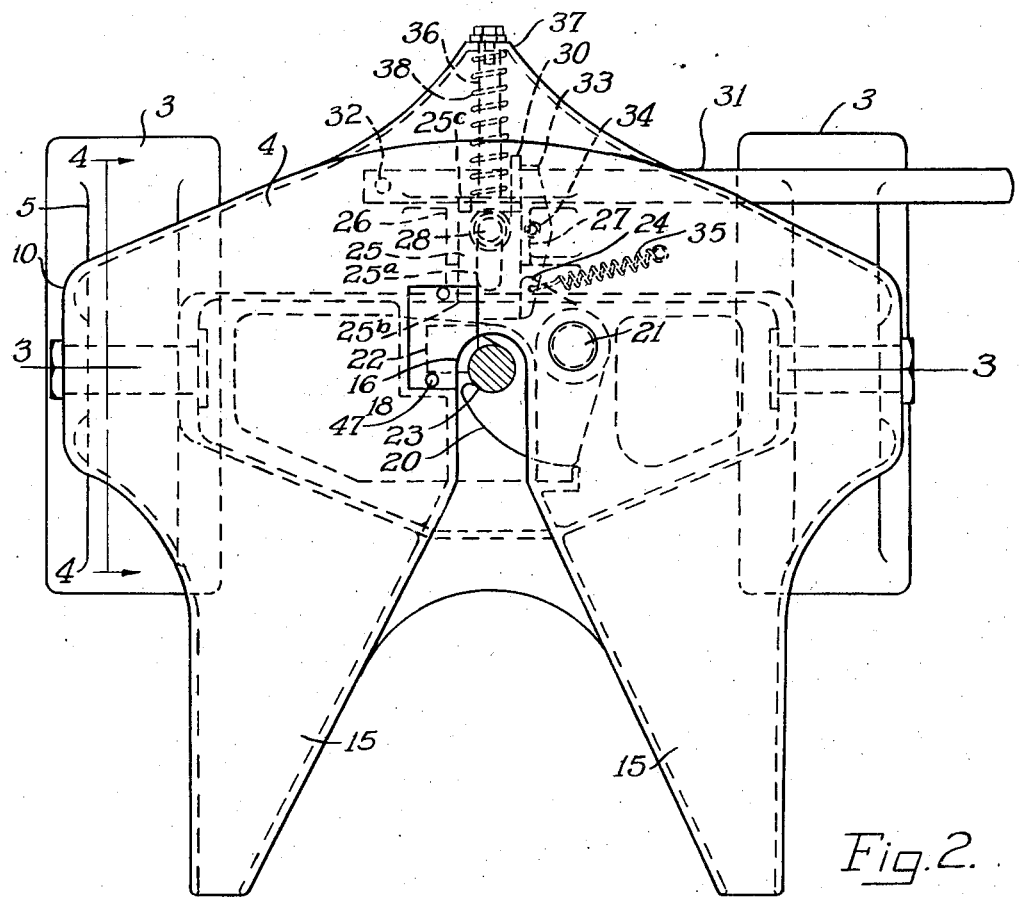
Figure 2 is a top plan view of the lower fifth wheel embodying certain features of the invention.

If desired, the cushioning effect of the mounting by means of helical springs alone, as best shown in Fig. 4, may be supplemented by the employment of resilient material, such as rubber, indicated at 13 in Figure 5, as being wound between and about the coils of the helical springs 8. The rubber or other resilient material 13 may be secured to the springs 8 in any suitable manner such as by vulcanization or riveting of the rubber to the springs. Or, it may be advisable to grease the helical spring and to dampen the noise of the spring action by means of an oil-treated antisqueak fabric or leather strip wound between the coils of the spring. In the event it is desired to accomplish this latter purpose, any suitable material, such as leather, fabric, or the like, or any other similar material which is commonly used for brake linings and which is flexible but not necessarily as elastic as rubber, may be substituted for the rubber or resilient material indicated at 13 in Figure 5, such relatively non-elastic material, such as leather, fabric, or other brake lining material, being wound between the spirals or coils of the helical springs 8 in the same manner as that indicated in reference to the rubber or resilient material at 13.

From the foregoing, it will be seen that the construction described provides a simple and economical mounting for the lower fifth wheel upon the tractor or pulling vehicle, which construction is so designed as to admit of ready assembly of the parts and to make provision not only for cushioning of the shocks incident to the coupling contact of the fifth wheels when the tractor is backed into the trailer, but also for cushioning of vertical and longitudinal thrust action of the tractor and trailer vehicles relative to one another during travel of said vehicles in coupled relation.

Having thus described our invention, what we claim as new and desire to secure by Letters Patent of the United States is:

1. Tractor-trailer coupling means comprising a fifth wheel of the detachable type for cooperation with a king pin coupling member, and mounting means for supporting said fifth wheel upon a vehicle, said mounting means comprising pivot means permitting free rocking movement of the fifth wheel, and resilient members directly supporting the fifth wheel and comprising springs coiled around the pivot means and floatingly supporting the fifth wheel at the pivot means, said springs being interposed between the fifth wheel and a portion of said mounting means, the fifth wheel being supported relative to said mounting means solely by the cooperation of the pivot means with said springs.

2. Tractor-trailer coupling means comprising a fifth wheel of the detachable type adapted to receive the impinging forces of a king pin coupling member to be engaged therewith, and yieldable supporting means for the said fifth wheel, said supporting means comprising supporting brackets, pivot means supporting said fifth wheel in a freely rocking manner relative to said brackets, and springs directly supporting the weight of the fifth wheel coiled around the pivot means and engaged with the pivot means and the brackets to floatingly support the fifth wheel relative to the brackets, said springs being interposed between the fifth wheel and the brackets, the fifth wheel being supported relative to said brackets solely by the cooperation of the pivot means with said springs.

3. Means as claimed in claim 2, combined with a resilient filler between the coiled portions of the springs.

4. Means as claimed in claim 2, combined with a strap of flexible but relatively non-elastic material wound between the coiled portions of the springs.

5. Tractor-trailer coupling means comprising a fifth wheel of the detachable type for cooperation with a king pin coupling member, and mounting means for supporting said fifth wheel upon a vehicle, said mounting means comprising pivot means permitting free rocking movement of the fifth wheel relative to the mounting means, and resilient members supporting the fifth wheel and comprising spiral springs coiled around the pivot means whereby the pivot means are directly supported upon the central convolutions of said springs to thereby floatingly support the fifth wheel at the pivot means, said springs being interposed between the fifth wheel and a portion of the mounting means, the fifth wheel being supported relative to said portion of the mounting means solely by the cooperation of the pivot means with said springs.

6. Tractor-trailer coupling means comprising a fifth wheel of the detachable type adapted to receive the impinging forces of a king pin coupling member to be engaged therewith, and yieldable supporting means for said fifth wheel comprising supporting brackets, pivot means connecting said fifth wheel in a freely rocking manner relative to said brackets, and spiral springs interposed between the fifth wheel and said brackets and coiled around said pivot means, the latter means engaging the central convolutions of said springs and the outer convolutions of the springs engaging the brackets to floatingly support the fifth wheel on the brackets, said pivot means being directly supported relative to said brackets entirely by said springs.

7. Tractor-trailer coupling means as claimed in claim 2 wherein said brackets have openings of larger diameter than said pivot means, the latter being received in said openings, the springs normally supporting the fifth wheel with said pivot means out of engagement with said brackets.

8. Means as claimed in claim 1 combined with a strap of anti-squeak lubricating material or the like wound between the coiled portions of the springs.

9. Tractor-trailer coupling means of the class described comprising a fifth wheel member of the detachable type adapted to receive the impinging forces of a king pin coupling means to be engaged therewith, and yieldable supporting means for said fifth wheel member comprising supporting brackets, pivot means supporting said fifth wheel in a freely rockable manner relative to said brackets, and spiral springs coiled around the pivot means, the latter directly engaging the central convolution only of said springs, said springs being interposed between the fifth wheel and the brackets, the fifth wheel being supported relative to the brackets solely by the cooperation of the pivot means with said springs.

10. Tractor-trailer coupling means of the class described comprising a fifth wheel member of the detachable type adapted to receive the impinging forces of a king pin coupling means to be engaged therewith, and yieldable supporting means for said fifth wheel member comprising a supporting bracket member, pivot means directly connected with one of said members, and a spiral spring coiled around the pivot means, the latter directly engaging the central convolution only of said spring, said spring being interposed between the pivot means and the other of said members with the outer convolution of said spring engaging said other of said members, said spring directly supporting the weight of the fifth wheel member in a freely rockable manner relative to said bracket member about the axis of said pivot means, said spring constituting the sole element of support intervening between said other of said members and said pivot means.

GEORGE WALTHER.
ELMER L. MILLER.